E. W. STROHN.
APPARATUS FOR IMPREGNATING FABRICS AND OTHER MATERIALS.
APPLICATION FILED MAY 14, 1909.

937,889.

Patented Oct. 26, 1909.
5 SHEETS—SHEET 2.

E. W. STROHN.
APPARATUS FOR IMPREGNATING FABRICS AND OTHER MATERIALS.
APPLICATION FILED MAY 14, 1909.
937,889.
Patented Oct. 26, 1909.
5 SHEETS—SHEET 3.
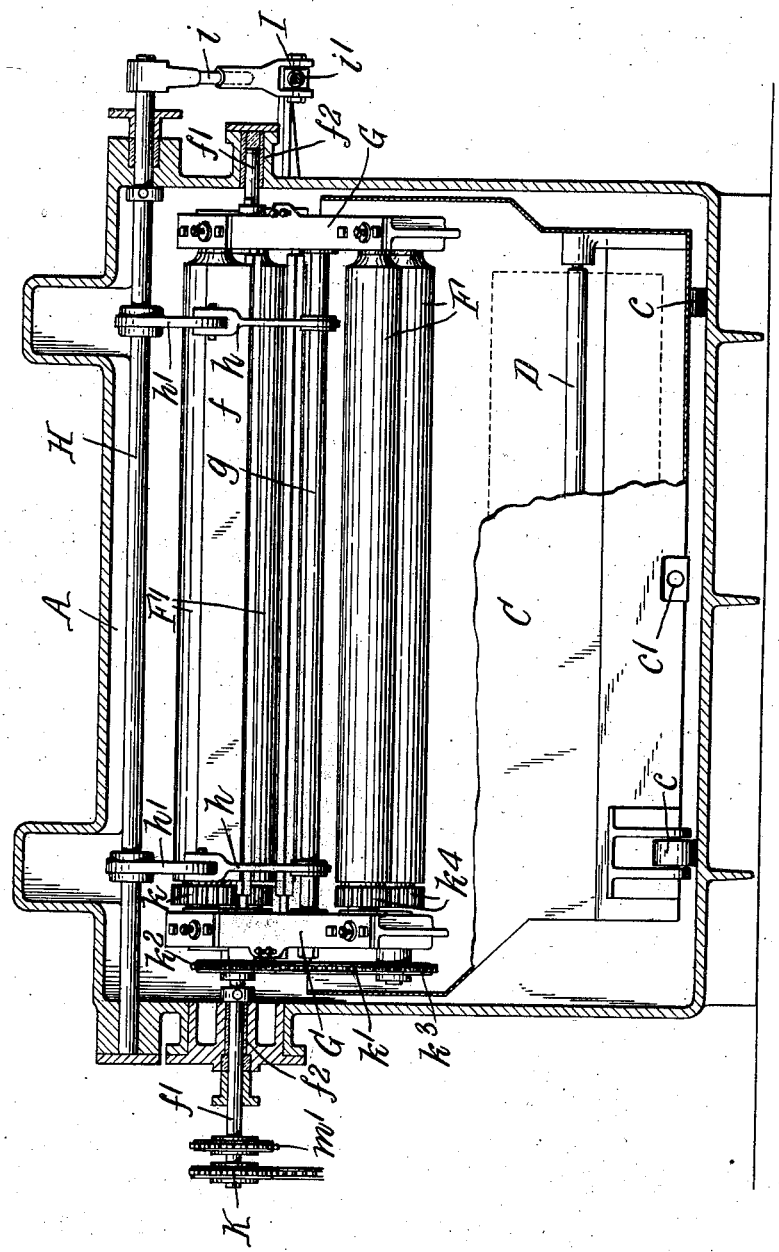
Witnesses:
A. G. Dimond.
E. A. Volk.
Inventor
Emil Wilhelm Strohn,
By Wilhelm, Parker & Hand,
Attorneys.

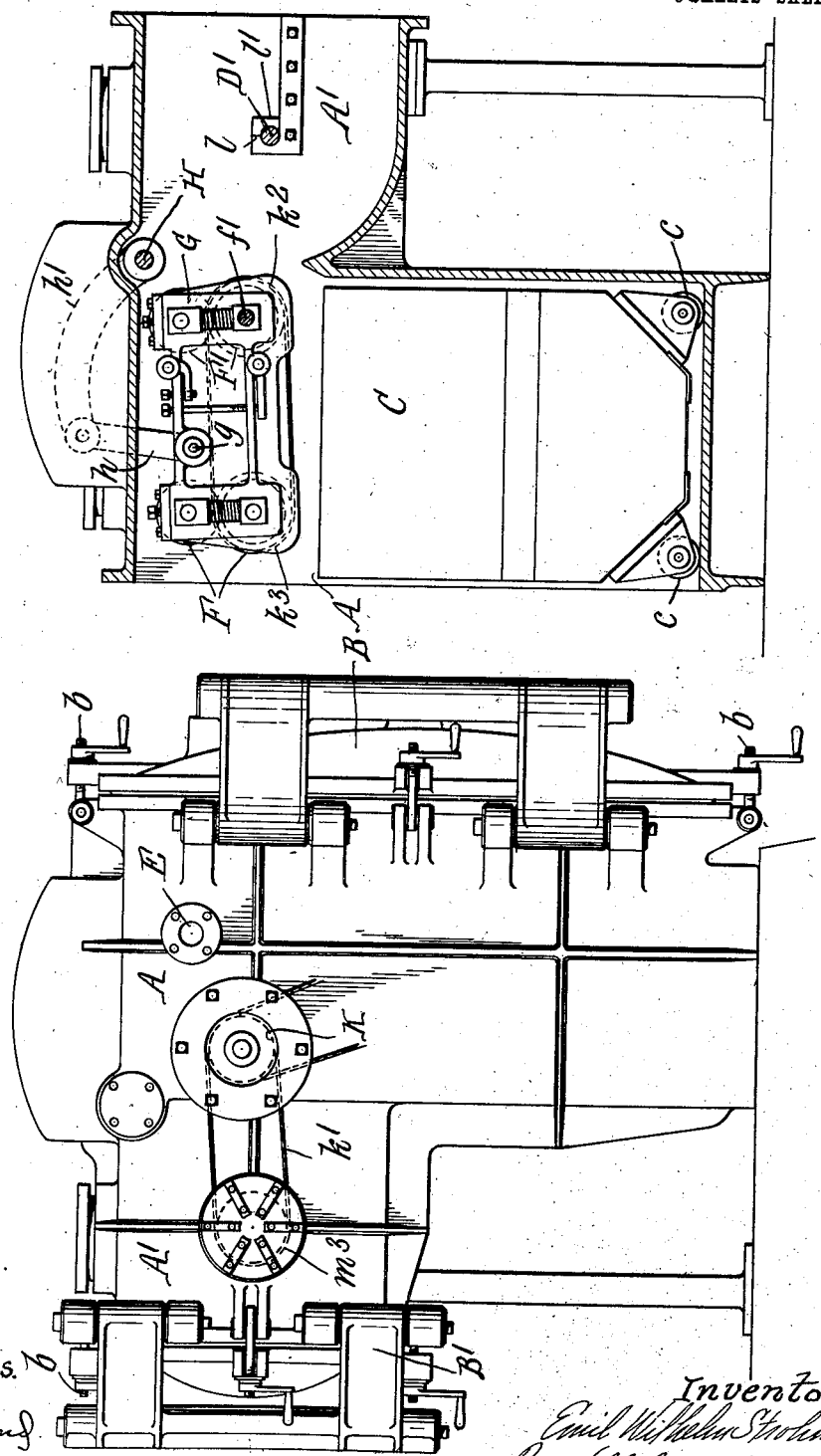

E. W. STROHN.
APPARATUS FOR IMPREGNATING FABRICS AND OTHER MATERIALS.
APPLICATION FILED MAY 14, 1909.
937,889.
Patented Oct. 26, 1909.
5 SHEETS—SHEET 5.
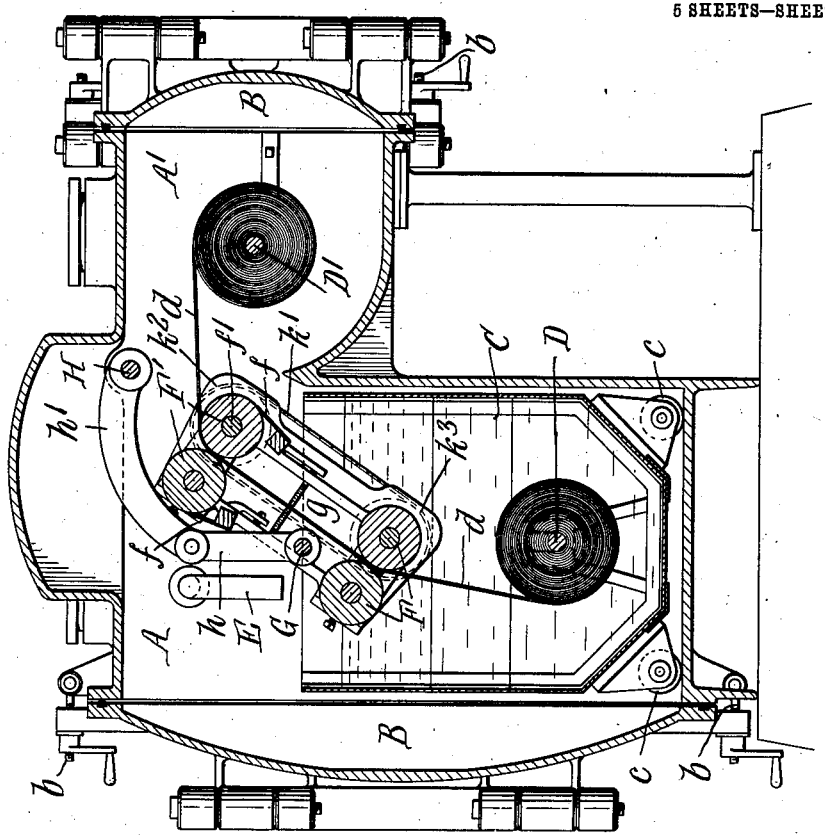
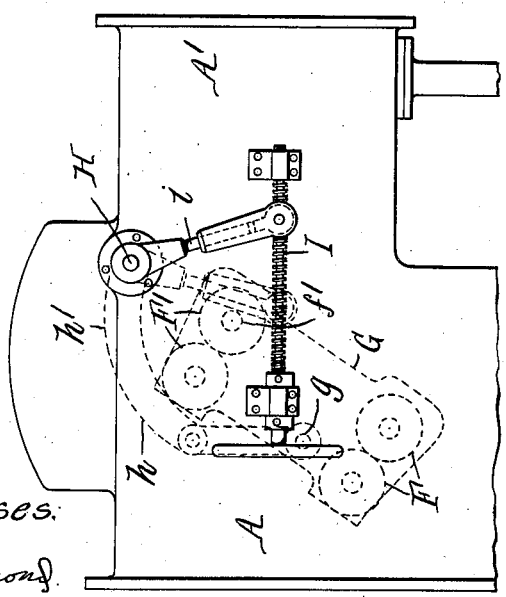
Witnesses:
A. G. Dimond
E. A. Volk
Inventor
Emil Wilhelm Strohn,
By Wilhelm, Parker & Hand
Attorneys.

UNITED STATES PATENT OFFICE.

EMIL WILHELM STROHN, OF BUFFALO, NEW YORK.

APPARATUS FOR IMPREGNATING FABRICS AND OTHER MATERIALS.

937,889.  Specification of Letters Patent.  Patented Oct. 26, 1909.

Application filed May 14, 1909. Serial No. 495,948.

*To all whom it may concern:*

Be it known that I, EMIL WILHELM STROHN, a subject of the Emperor of Germany, residing at Buffalo, in the county of Erie and State of New York, have invented a new and useful Improvement in Apparatus for Impregnating Fabrics and other Materials, of which the following is a specification.

This invention relates to apparatus for impregnating or coating lengths or strips of fabric and other material with a liquid preferably in a closed chamber from which the air can be exhausted and in which the treatment can be carried on under atmospheric or higher artificial pressure for forcing the liquid more completely into the pores, meshes or interstices of material.

The apparatus is especially adapted for impregnating or treating fibrous webs, belts, bands, cords, &c., with insulating waterproofing and other compounds, but is also desirable for other purposes.

One object of the invention is to provide the impregnating or treating chamber with a portable tank which contains the impregnating or treating liquid and which can be moved into and out of the chamber. This prevents the liquid from coming into contact with the inner surface of the chamber, keeps the latter clean, facilitates the cleaning of the tank, and permits the convenient use of different liquids in the same chamber by providing a separate tank for each liquid.

Another object of the invention is to provide an efficient and convenient arrangement of feeding and pressure rolls for forcing the liquid into the impregnated or treated material.

Figure 1:
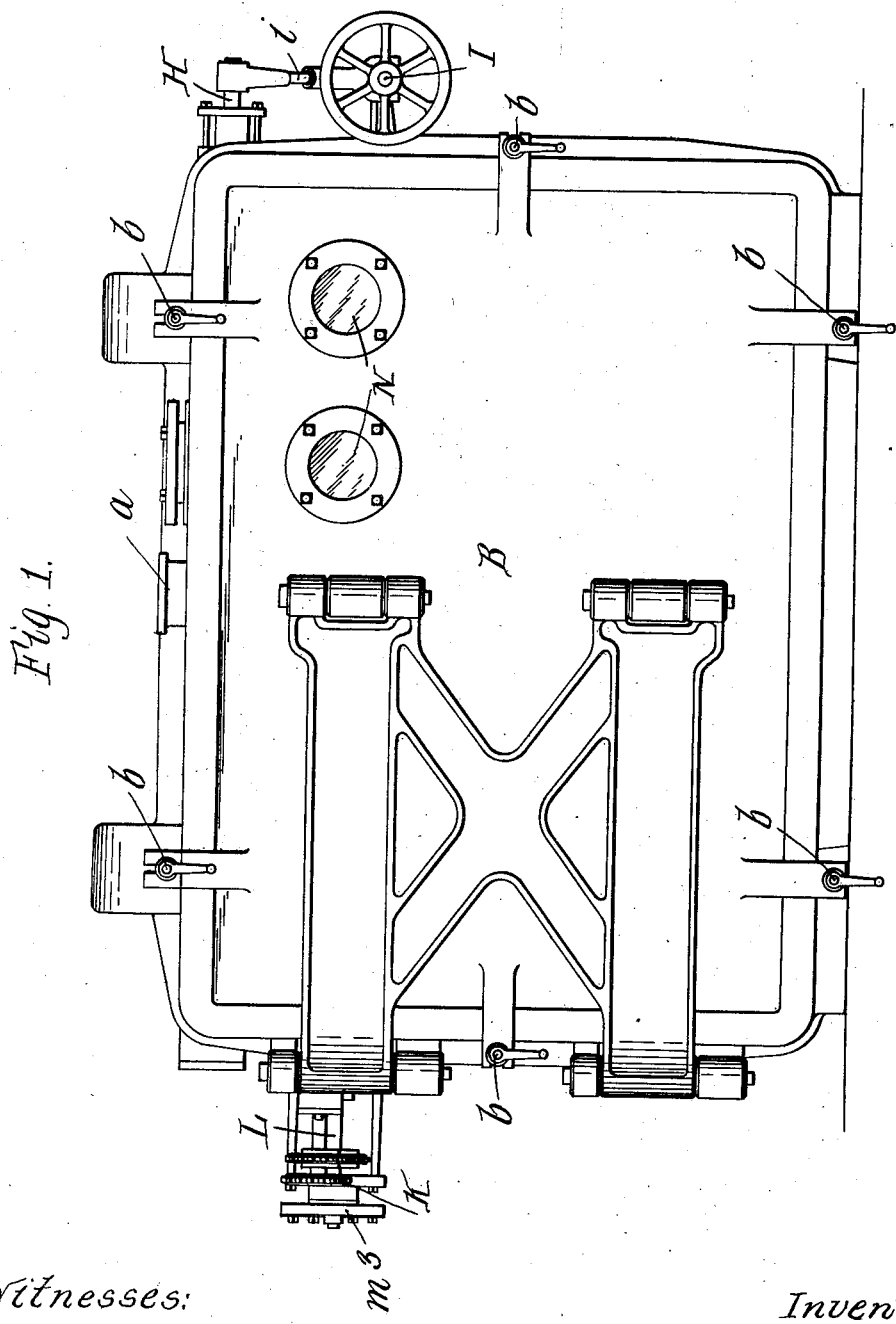
Figure 2:
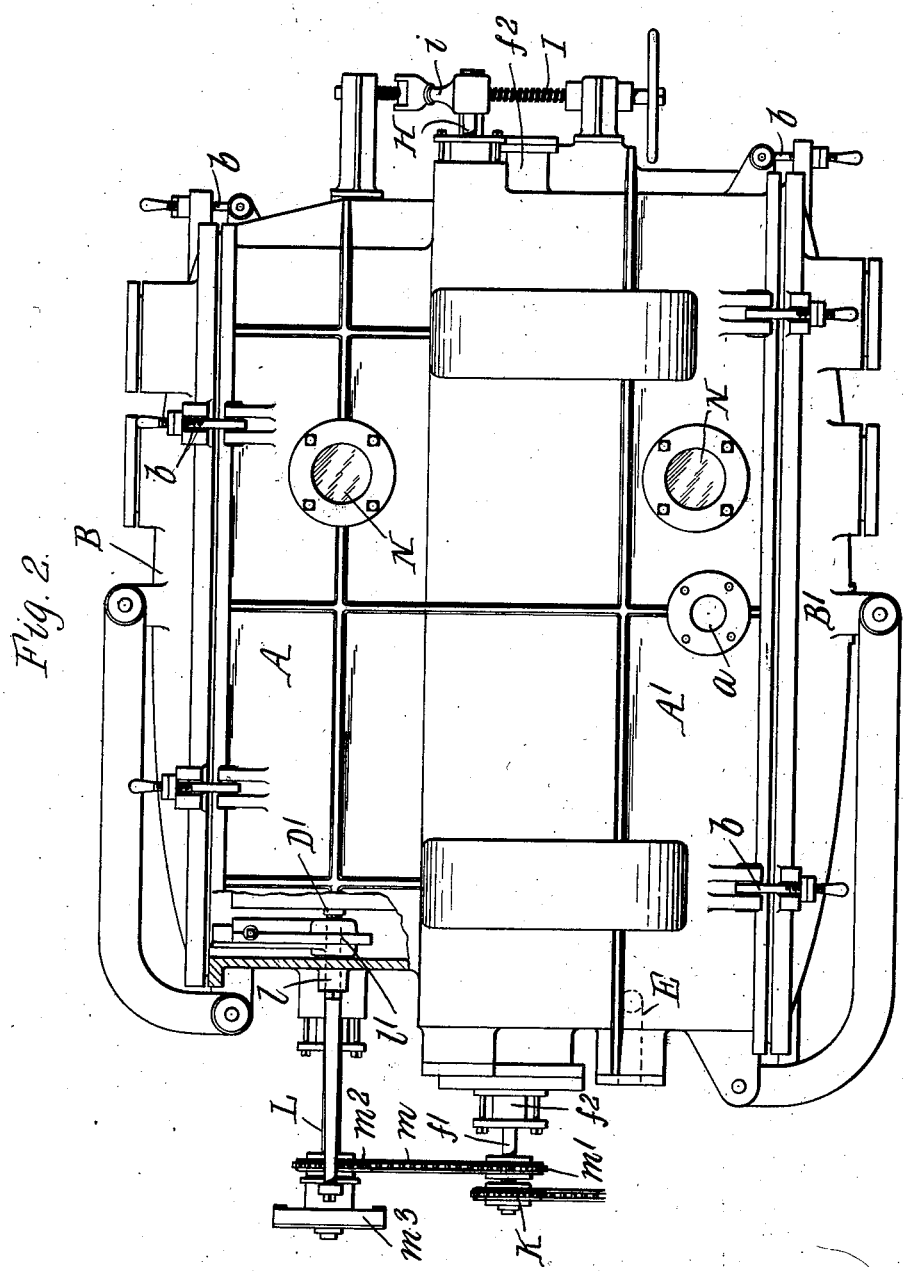

In the accompanying drawings, consisting of five sheets: Figure 1 is a front elevation of an impregnating apparatus embodying this invention. Fig. 2 is a plan view thereof. Fig. 3 is a longitudinal sectional elevation thereof. Fig. 4 is an elevation of one end thereof. Fig. 5 is a transverse sectional elevation showing the pressure rolls elevated out of the liquid tank. Fig. 6 is a fragmentary elevation of the opposite end of the apparatus. Fig. 7 is a transverse sectional elevation thereof, showing the pressure rolls in operative position.

Like reference characters refer to like parts in the several figures.

The impregnating chamber preferably comprises a front compartment A and a smaller rear compartment A' projecting rearwardly from the upper portion of the front compartment, and it is provided with removable front and back covers or doors B and B', respectively, fastened to the casing by screw bolts $b$, or other suitable means, for giving access to said compartments. The casing is provided in its top with an opening $a$, Fig. 2, for connection with an exhaust device and a device by which fluid pressure can be applied to the contents of the chamber.

C represents a tank or vessel for holding the impregnating liquid or compound. This tank is located in the front compartment A of the impregnating chamber, from which it is removable when the front door or cover is opened, the tank being preferably furnished with casters $c$ to enable it to be readily rolled into and out of the chamber and moved about. A hole $c'$ is provided in the lower portion of the tank for draining the liquid therefrom.

D represents the drum or reel from which the web, belt or band $d$ of material is unwound to be impregnated, and D' represents the drum or reel upon which the material is wound after it has been impregnated. The delivery drum D is removably journaled in the liquid tank C and the receiving drum D' is removably journaled in the rear compartment A' of the impregnating chamber, from which it can be removed when the back door or cover B' is opened.

The tank is filled with the impregnating liquid to a suitable height, as indicated in Fig. 7, the liquid being supplied through an inlet pipe E, Figs. 2 and 7, at one end of the chamber, and the web, belt or band passes from the delivery drum D through this liquid to and between a pair of primary pressure and feed rolls F by which the impregnating liquid or compound is forced into the pores or interstices of the material, and then between a final pair of pressure rolls F' by which the impregnated material is squeezed before it is wound upon the receiving drum D'. The final pressure rolls F' may be provided with scrapers $f$ for keeping them free from adhering matter. These pressure rolls F and F' are movably mounted in the upper portion of the front compartment A of the impregnating chamber so that they can be lowered to place the primary rolls F in the liquid tank, and raised above the top of the tank to permit the latter to be readily moved into and out of the chamber. In the construction shown in the drawings the shaft $f'$ of the lower roll of the final pair is journaled in suitable bearings $f^2$ in the end walls of the impregnating chamber, see Fig. 3, and frames G hung on this roll-shaft $f'$, so as to swing vertically, are provided with suitable bearings for the journals of the other rolls. A cross rod $g$ connecting the swinging frames G is connected by links $h$ to arms $h'$ secured to a horizontal rock shaft H which is journaled in the upper part of the chamber. One end of this rock shaft extends out of the chamber and is provided with an arm $i$ carrying a nut $i'$, Fig. 3, which works on an operating screw-shaft I. By turning this screw-shaft the bearing frames G for the pressure rolls can be raised and lowered for supporting the rolls above the liquid tank, as shown in Fig. 5, and immersing the primary pressure rolls F in the liquid in the tank, as shown in Fig. 7. The pressure rolls could be raised and lowered for the purpose stated by other suitable means.

The pressure rolls and receiving drum D' may be driven by any suitable means so as to unwind the material from the delivery drum and wind it on the receiving drum. As shown in the drawings, the lower roll of the final pair F' is driven by a sprocket wheel K secured on its shaft $f'$ outside of the impregnating chamber, and the other roll of this pair by a pair of gear wheels $k$ connecting the rolls, and the primary pressure rolls F are driven from one of the secondary rolls by a chain belt $k'$ running around sprocket wheels $k^2$ $k^3$, and by connecting gear wheels $k^4$.

A shaft L, Fig. 2, is journaled in bearings on one end of the impregnating chamber and a bracket $l$ projecting therefrom has one end extending into the rear compartment of the impregnating chamber and detachably connected by a suitable coupling device $l'$ to the adjacent end of the shaft of the receiving drum D'. This shaft L is driven by a chain belt $m$ running around a sprocket wheel $m'$ on the roll shaft $f'$ and a sprocket wheel $m^2$ which is connected to the shaft L by a suitable friction drive device $m^3$, which permits the motion of the receiving drum to vary relative to that of the pressure rolls as the roll of material on the drum increases in diameter. The impregnating chamber is provided with suitable transparent observation panes N.

In the operation of the apparatus the delivery drum D containing the web, belt or band of material to be impregnated is placed in the liquid tank C and the latter rolled into the impregnating chamber, while the pressure rolls F and F' are in their elevated position. The front end of the material is passed between the sets of pressure rolls and attached to the receiving drum D', the screw shaft I is operated to lower the pressure rolls F into the liquid tank, and the impregnating chamber is closed. The apparatus is then exhausted and the impregnating liquid admitted to the tank C through the pipe E.

The material is wound onto the receiving drum D' from the delivery drum D and travels slowly through the impregnating liquid in the tank C, whereby the material becomes charged with the liquid or compound. The latter is forced into the pores, meshes or interstices of the material by the primary feeding and pressure rolls F, the final pressure rolls F' also serving to remove any excess impregnating composition adhering to the material. When the material has been impregnated and wound upon the receiving drum, the latter, containing the material, is removed from the chamber through the back door B'. The fabric or material to be impregnated may be arranged in folds instead of being wound upon drums. As the delivery and receiving drums and the intermediate feed and pressure rolls are all located within the closed impregnating chamber, the latter can be exhausted before admitting the impregnating liquid to the chamber, and the chamber can also be placed under fluid pressure, if desired, for increasing the impregnating action by admitting steam or air under pressure to the chamber through the opening $a$, or in any other suitable way.

The movable mounting of the feed and pressure rolls in the impregnating chamber as described, not only facilitates the movement of the tank into and out of the impregnating chamber, but as the delivery drum is the only part of the apparatus mounted in the liquid tank, the latter can be readily cleaned by first removing the drum. Furthermore, when the feed and pressure rolls are raised as shown in Fig. 5, they leave the impregnating chamber unobstructed so that it can be entered for cleaning the same and the feed and pressure rolls.

I claim as my invention:

1. In an impregnating apparatus, the combination of an impregnating chamber in which the impregnating liquid is contained, a delivery drum arranged in the chamber and containing the material to be impregnated, a receiving drum also arranged in said chamber and adapted to receive the impregnated material, primary and final pressure rolls arranged in the chamber and acting upon the material as it passes from the delivery drum to the receiving drum, said primary rolls being arranged to dip into the liquid and apply the same to the material, and said final rolls being arranged out of the liquid for squeezing the impregnated material, substantially as set forth.

2. The combination of a treating chamber, a tank for the treating liquid which is removable from the chamber, and pressure rolls for acting upon the material, said rolls being movably mounted in the chamber and adapted to be lowered into and raised out of said tank, substantially as set forth.

3. The combination of a treating chamber, a tank for the treating liquid which is removable from the chamber, pressure rolls movably mounted in the chamber for acting upon the material, and means for lowering said pressure rolls into and raising them out of said tank, substantially as set forth.

4. The combination of a treating chamber, a tank for the treating liquid which is removable from the chamber, a delivery drum arranged in said tank and containing the material to be treated, a receiving drum arranged in the chamber and adapted to receive the treated material, pressure rolls movably mounted in the chamber between said delivery and receiving drums for acting upon the material, and means for raising and lowering said pressure rolls, substantially as set forth.

5. In an impregnating apparatus, the combination of an impregnating chamber having front and rear doors, a tank for the impregnating liquid which is removable from the chamber through said front door, a delivery drum arranged in said liquid tank and containing the material to be impregnated, a receiving drum for the material arranged in the chamber and being removable therefrom through said rear door, pressure rolls movably mounted in the chamber between said delivery and receiving drums for acting upon the material, and means for raising and lowering said pressure rolls, substantially as set forth.

6. In an impregnating apparatus, the combination of an impregnating chamber, a tank for the impregnating liquid which is removable from the chamber, pressure rolls arranged in the chamber for acting upon the material, the shaft of one of said rolls having bearings in the chamber, swinging frames hung on said roll shaft and carrying the other pressure rolls, and means for raising and lowering said pressure rolls in the chamber, substantially as set forth.

7. In an impregnating apparatus, the combination of an impregnating chamber, a tank for the impregnating liquid which is removable from the chamber, pressure rolls arranged in the chamber for acting upon the material, the shaft of one of said rolls having bearings in the chamber, swinging frames hung on said roll shaft and carrying the other pressure rolls, drive means for said roll shaft, drive connections between said shaft and the other rolls, and means for raising and lowering said pressure rolls in the chamber, substantially as set forth.

8. In an impregnating apparatus, the combination of an impregnating chamber, a tank for the impregnating liquid which is removable from the chamber, a delivery drum arranged in said liquid tank and containing the material to be impregnated, a receiving drum arranged in the chamber and adapted to receive the impregnated material, pressure rolls arranged in the chamber for acting upon the material, the shaft of one of said rolls having bearings in the chamber, swinging frames hung on said roll shaft and carrying the other pressure rolls, drive means for said roll shaft, drive connections between said shaft and the other rolls and between said roll shaft and said receiving drum, and means for raising and lowering said pressure rolls in the chamber, substantially as set forth.

Witness my hand, this 8th day of May, 1909.

EMIL WILHELM STROHN.

Witnesses:
C. B. HORNBECK,
C. W. PARKER.